United States Patent [19]

Cano

[11] Patent Number: 4,551,193
[45] Date of Patent: Nov. 5, 1985

[54] APPARATUS FOR APPLYING REINFORCEMENT BOTTOMS TO PLASTIC BOTTLES

[75] Inventor: Manuel I. Cano, Barcelona, Spain

[73] Assignee: Ensamblaje y Manipulacion Industrial, S.A. (EMINSA), Barcelona, Spain

[21] Appl. No.: 550,695

[22] Filed: Nov. 10, 1983

[30] Foreign Application Priority Data

Jan. 27, 1983 [ES] Spain .................................... 519328

[51] Int. Cl.⁴ .............................................. B29D 3/00
[52] U.S. Cl. .................................. 156/423; 156/556; 156/566; 425/526; 425/534
[58] Field of Search ............... 156/293, 423, 556, 566; 264/530, 537; 425/523, 526, 530, 533, 534

[56] References Cited

U.S. PATENT DOCUMENTS

| | | | |
|---|---|---|---|
| 4,116,606 | 9/1978 | Valyi | 425/526 |
| 4,207,134 | 6/1980 | Valyi | 156/556 |
| 4,384,904 | 5/1983 | Aidlin et al. | 156/556 |
| 4,414,055 | 11/1983 | Young | 156/423 |
| 4,441,955 | 4/1984 | Richardson et al. | 156/423 |

*Primary Examiner*—Caleb Weston
*Attorney, Agent, or Firm*—Cushman, Darby & Cushman

[57] ABSTRACT

An apparatus for installing reinforcing bottom cups on blow molded plastic containers includes a transfer arm which grasps the outer peripheries of a plurality of molded hollow containers, such as bottles, by suction means, transfers the thus held bottles to a first station at which previously adhesively coated bottom cups are pushed upwardly on to the bottoms of the containers, from which station the thus reinforced bottomed containers are sequentially discharged.

5 Claims, 7 Drawing Figures

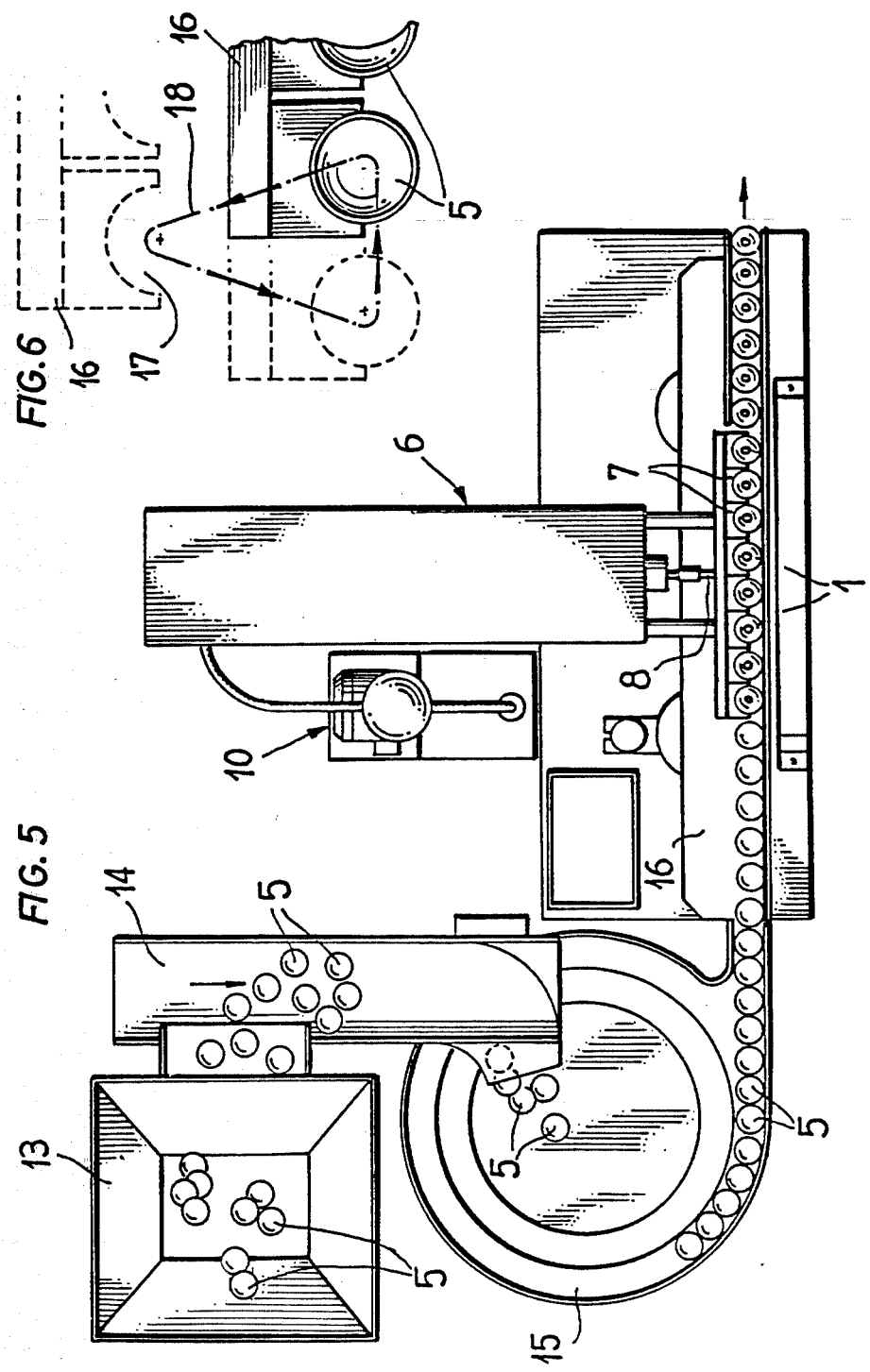

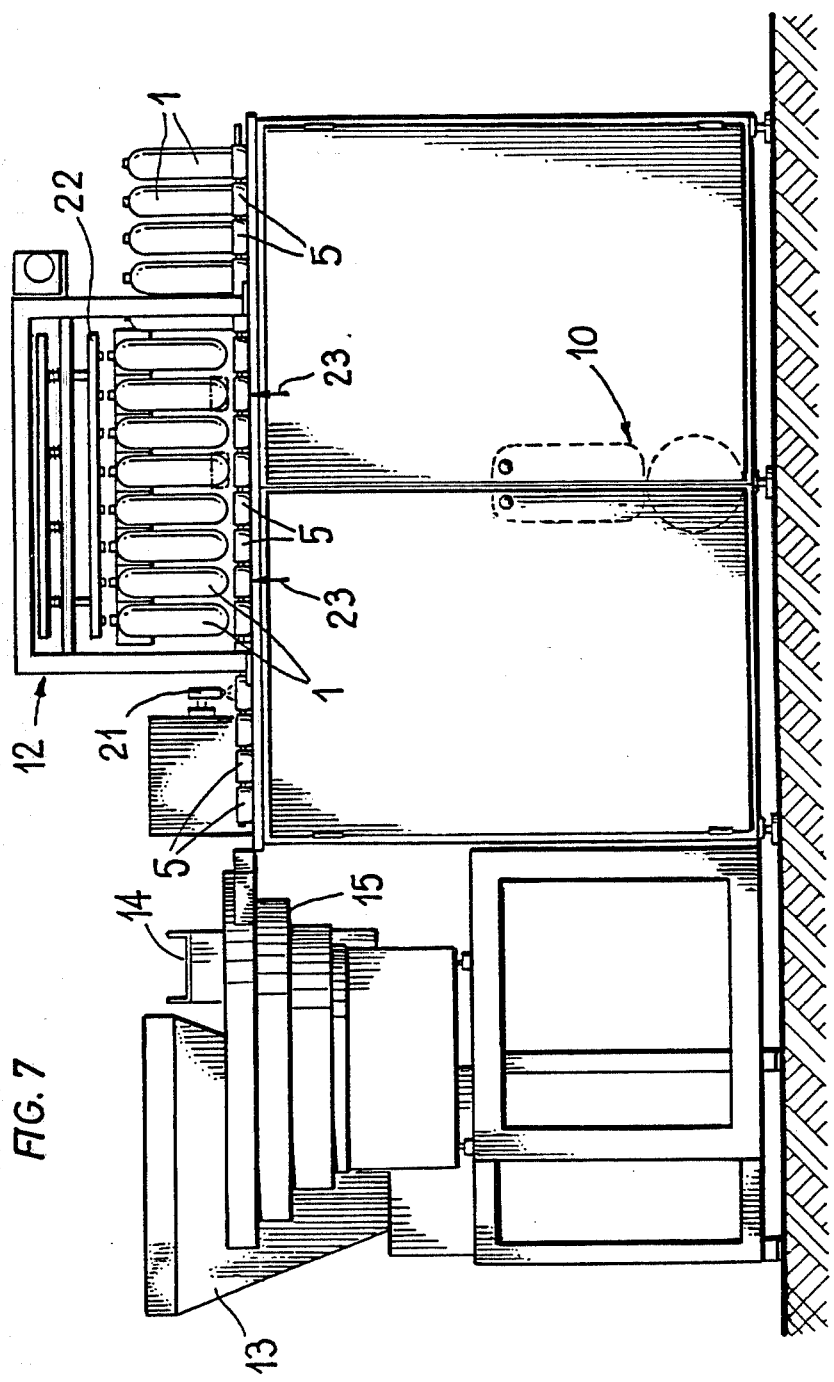

APPARATUS FOR APPLYING REINFORCEMENT BOTTOMS TO PLASTIC BOTTLES

The present invention refers to a method for applying reinforcement bottoms in plastic bottles and a device for executing same. The bottles are of the type whose neck is moulded by injection, and whose body is moulded immediately afterwards by blowing, performing the simultaneous moulding of several bottles in moulds aligned in rows in the moulding machine; the said reinforcement bottoms comprise shallow concave casings, each bottom being adapted to be applied externally on the bottom part of the bottle body already moulded, and to be firmly fixed to it by gluing.

Bottles of this type are moulded in an injection moulding and blowing machines, whose injection moulds hang the bottle after being moulded and let it fall into a hopper or outlet ramp. Bottles are generally manufactured six by six, eight by eight or ten by ten.

Once the bottle has left the moulding machine, the reinforcement bottom can be applied manually or mechanically, two mechanical methods being known.

In the first mechanical method known, the bottles fall from the outlet ramp onto some individual concave housings, shaped like a curved roof tile, arranged on an endless conveyor belt. To begin with, these housings are slanted 40° to receive the bottles which fall from the outlet ramp, but then become upright and continue in a vertical position, advancing step by step until they reach a station in which the bottles are applied, one by one, on previously glued bottoms, and immediately transferred to another unloading conveyor belt.

In the second mechanical method known, the bottles fall vertically onto a conveyor belt also provided with individual housings, and reach a machine provided with a circular work platform, which moves forward step by step, in which the bottoms are previously glued and loaded, which have to be applied to the bottles. Each bottle is then transferred from the conveyor belt to the circular platform and placed and pressed on a previously glued reinforcement bottom, then advancing circularly and being removed from the platform.

These known methods have numerous disadvantages, among which we can mention the following:

The manual method is very slow and expensive, which means that it is hardly used.

The mechanical methods need voluminous devices to be used, which are likely to break down.

In these mechanical methods, the bottle is taken by the neck by means of a clip and is strongly applied against the bottom, which produces a serious problem of centering and vertically in the bottles, in the delicate moment of applying them to the bottom.

On exerting the pressure of the bottom against the bottom, when applying it, there are frequently deformations in the bottle, since it is still in the cooling and solidification period of the material comprising it.

Through the method and device object of the present invention, the disadvantages mentioned are entirely eliminated and a quicker and more efficient production is attained in applying the reinforcement bottoms in plastic bottles.

In essence, the method concerned is characterized in that some sustaining means are applied to the bottles simultaneously, which have just been moulded and bofore opening the injection moulds of the necks, from which they are hung, lined up in a row; these sustaining means hold the bottles by suction, when the said injection moulds open, then performing a first downward movement, together with the bottles the are holding, whereby the bottle necks are removed from the injection moulds, and in a second traverse movement, with which the bottles are removed from the moulding machine and taken to a station for applying the respective reinforcement bottoms, in which they are placed in vertical alignment on the said reinforcement bottoms which have previously been placed in the aforementioned station by feeder means and in which the glue has already been applied by gluing devices; the reinforcement bottoms are centered by gravity by means of some centering devices of the bottoms; regarding the bottles, they are firmly immobilized by sustainer means and some centering-blower devices applied in their inlets which center the bottles and insert pressurized air inside them, at the same time as the reinforcement bottoms are shifted upwards and applied firmly against the bottom part of the bottom body, after which the bottles are lowered, with the bottoms already applied and are removed from the base-application station through the bottoms feeders themselves, at the same time as the latter supply new bottoms to be glued in a new cycle.

Other characteristics and advantages of the object of the present invention will become evident from the description to be made herinbelow in connection with the attached drawings, which illustrate, by way of unlimiting example, a form of embodiment of device in accordance with the invention.

FIGS. 4, 5 and 7 illustrate side elevation, plan and front elevation views, respectively, of the device object of the present invention; and FIG. 6 illustrates a schematic representation of the feed movement of an element with forms part of the feed means of the reinforcement bottoms.

Figure 1:
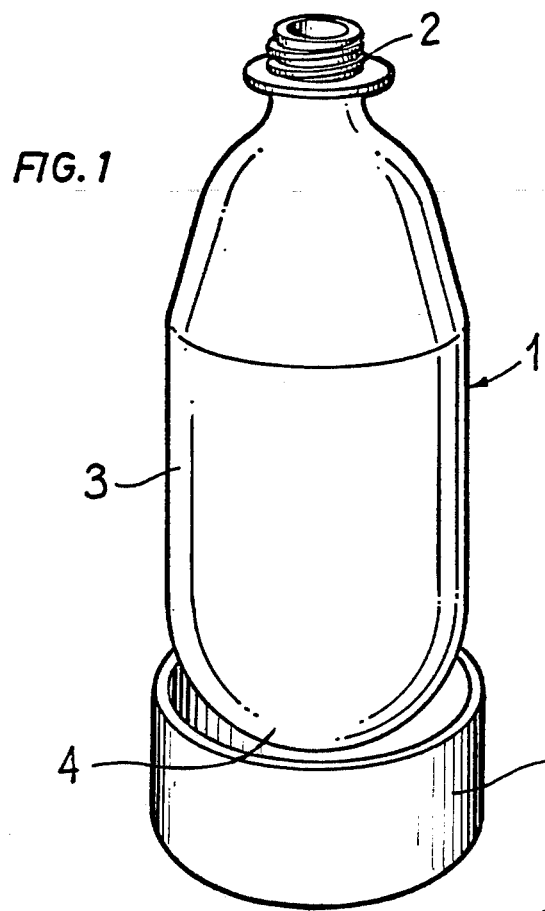
FIG. 1 is a perspective view of a bottle and a reinforcement bottom, separated, but in the correlative fitting position.

The device according to the invention can be used in applying reinforcement bottoms 5 in the lower part 4 of the body 3 of a bottle 1, whose neck 2 is moulded by injection and whose body 3 is moulded immediately afterwards by blowing.

The device includes some sustaining means 6, comprising pneumatic suction heads 7, mounted in the end of a supportarm 8, which at the other end is joined to the respective motor parts and to a negative air pressure producing part, like a vacuum pump 10, each of these pneumatic suction heads 7 being provided with a surface 11 for applying to the bottle 1, provided with a concave configuration which adapts perfectly to a half profile part of the bottle.

Figure 2:
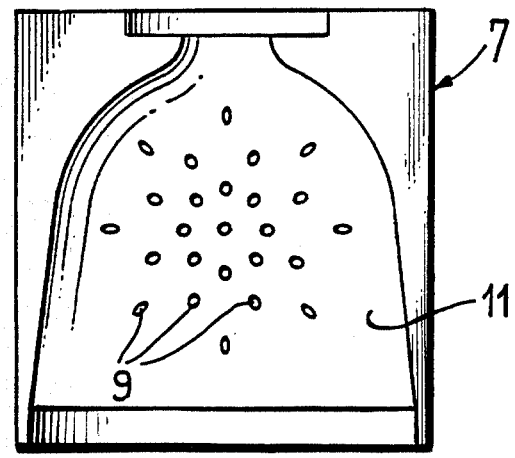
FIGS. 2 and 3 are both front elevation and side elevation views, respectively of an element which forms part of the sustaining means of the bottles, applicable to the type of bottles illustrated in FIG, 1.
Figure 3:
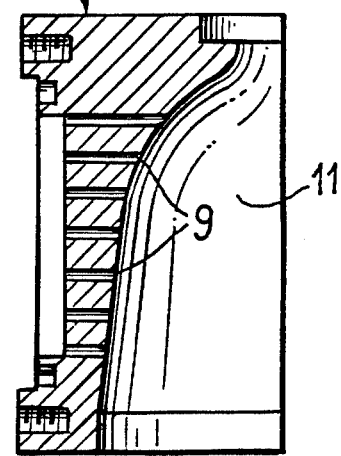

In FIGS. 2 and 3 one of these pneumatic suction heads 7 can be seen in detail, applicable to the type of bottles illustrated in FIG. 1, and which is slightly different in its top part from the bottles 1 shown in FIGS. 4 to 7. This head 7 is provided with multiple holes 9 in its application surface 11, for the air to pass.

Figure 4:
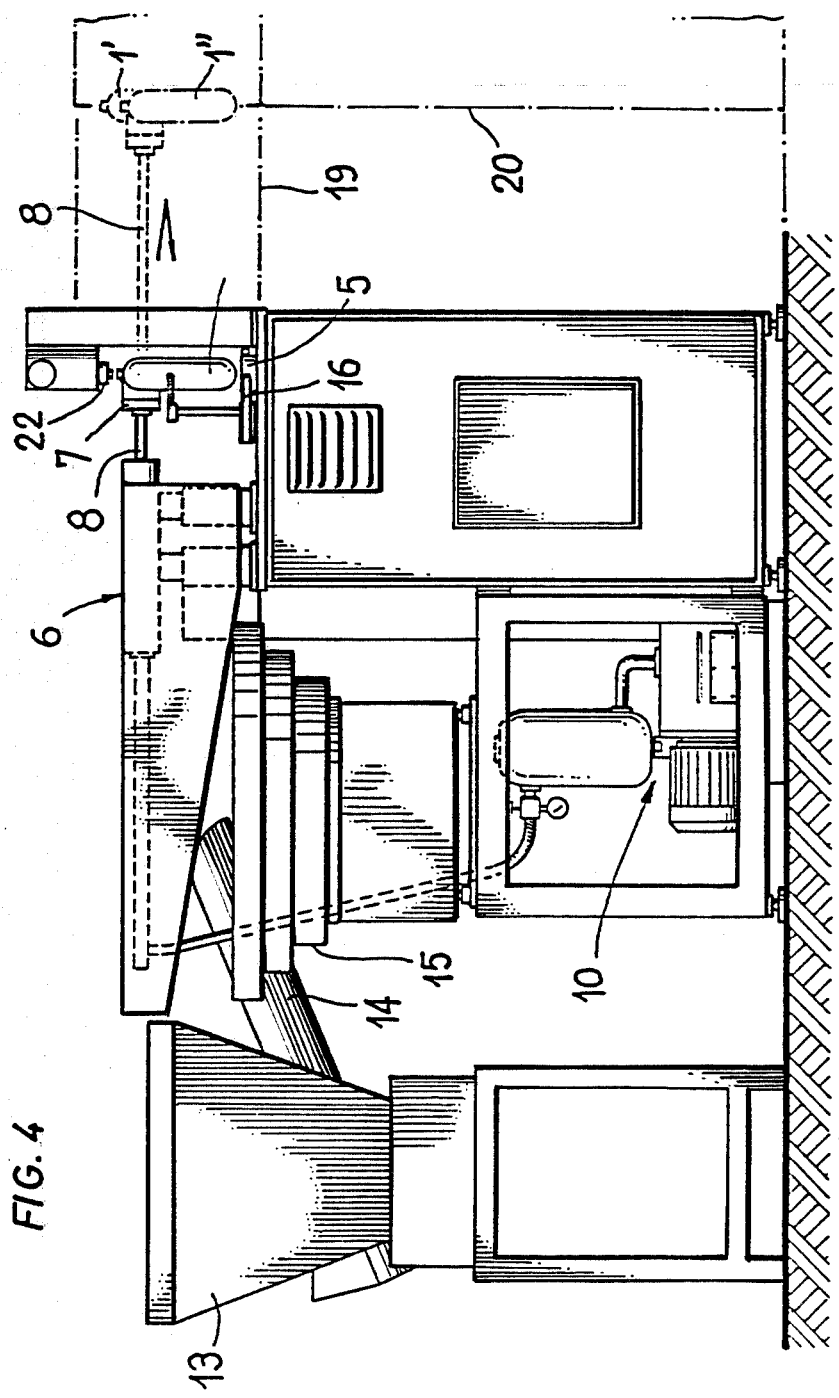

The heads 7 are applied onto the bottles 1, which have simultaneously been finished moulding and before opening the injection moulds of the necks 2, i.e. in position 1' of the bottles shown in FIG. 4 of the drawings. Once these injection moulds are open, the sustainer means 6, together with the bottles 1 which they ae securing, perform a first downward movement until they reach position 1", so that the necks 2 of the bottles 1 are removed from the said injection moulds. The supporting means 6 perfrom a second traverse movement, whereby the bottles ae removed from the moulding machine, represented schematically as 20, and are taken to a station 12 for applying the respective reinforcement bottoms 5, being positioned in vertical alignment on the said bottoms 5 which have previously been placed in the aforementioned station 12 by some feeder means and in which the glue has already been applied through gluing means.

The device includes thermally insulating protection around the path of the traverse movement which the heads 7 and the arm 8 make between the moulding machine 20 and the application station 12 of the reinforcement bottoms 5. This protection is diagramatically represented in FIG. 4 as 19.

The aforementioned feeding means of the reinforcement bottoms 5, include a previous positioning device, which in itself is known, which places the reinforcement bottoms 5 in line and in the current position, in the same plane as that of station 12 for applying the bottoms, 5. This positioning device comprises a hopper 13, a conveyor belt 14 and a shaker 15.

The said feeding means also include a transporter part 16, made up of a strip provided with a plurality of semicircular concavities 17, whose contour is considerably the same as the half of the perimetrical contour of a bottom 5; the strip is provided with a strip with a pilgrim step movement which describes a triangle 18 in each step (FIG. 6), in a plane parallel to that of the feed of the bottoms 5. The strip 16 performs in each cycle as many feed movements or steps as reinforcment bottoms 5 are to be applied, i.e. that it performs a number of feed movements equal to that of the bottles 1 simultaneously picked up by the supporting means 6 and in the case illustrated, therefore performs eight feed movements in each cycle.

On reaching station 12 for applying the bottoms 5, the latter have already been provided with glue in their inside. If quick-sticking glue is used, this is applied simultaneously in all the bottoms 5 which are to be applied in a single cycle, whereas if slow glue is used, a single gluing head 21 can be used, which will provide glue successively to the bottoms 5 corresponding to a simultaneous application.

In station 12, the reinforcement bottoms 5 are centered by gravity by centering devices, comprising concave housings whose inner configuration is adapted to the lower outside configuration of the bottoms 5.

At this moment, the bottles 1, kept firmly immobile by the sustaining means 6, receive in their upper mouths some centering-blower devices 22, which perform the centering of the bottles and which insert pressurized air inside them, to avoid deformations being produced in the body 3 of the bottle 1, at the moment when the reinforcement bottoms 5 are shifted in an upward direction, according to the arrows 23, and applied firmly against the lower wall 4 of the body 3 of the bottle 1. The external pressure created by this strong application of the bottoms 5 against the bottles 1, is counteracted with the introduction of the pressurized air inside the bottles 1.

Once the bottoms 5 are applied to the bottles 1, these are removed from the station 12 for applying the bottoms 5, through the actual bottom feeder devices and more specifically, through the actual strip 16, at the same time as this strip feeds new bottoms 5 to be glued in a new cycle.

After sufficiently disclosing the nature of the invention, as well as the way of working it, it is stated that anything which does not alter, change or modify its basic principle, can be liable to variations in detail, being the essence thereof, and for which a Patent of Invention is applied, for twenty years, as disclosed in the following claims:

I claim:

1. An apparatus for applying bottom cups to blow molded, hollow plastic containers having injection molded necks comprising
   means for transferring a plurality of the containers substantially simultaneously from a molding device to a first station, said means for transferring including suction means for individually engaging the exterior or each container and holding each container in a predetermined orientation at said first station,
   means for applying adhesive to bottom cups and means for feeding a plurality of said cups to said first station with each cup aligned with a container so as to receive the bottom of a container therein,
   means for moving a plurality of the aligned cups toward the bottoms of the containers and to press a respective cup against a respective bottom of a container, and means for supplying a gas under pressure to the interior of each container while the cups are being pressed against the container bottoms,
   said means for transferring being operative to then release the containers whereby the containers are transferred to said means for feeding which operates to discharge the containers from said apparatus.

2. The apparatus as claimed in claim 1 wherein said means for transferring includes a support arm having, at one end, said suction means, said suction means including a plurality of surfaces shaped to complementarily engage the surfaces of the containers including at least one-half of the profile of each container.

3. The apparatus as claimed in claim 2 further including a thermally insulated enclosure surrounding the distance traversed by said means for transferring between the molding device and said first station.

4. The apparatus as claimed in claim 2 wherein said apparatus includes positioning means upstream of said means for feeding a plurality of said cups to said first station, said positioning means including a conveyor member for delivering bottom cups to said feeding means, said feeding means including a strip having a plurality of semi-circular concavities shaped to complementarily fit the outer periphery of the bottom cups, said feeding means including means for moving said strip sequentially in a triangular pattern so as to move from said conveyor portion to said first station and then to a discharge position.

5. The apparatus as claimed in claim 2 wherein centering means are provided for the bottom cups in said first station, said centering means including a plurality of concave housings, one for each bottom cup at said first station, said concave housings each being shaped to closely conform to the outer configuration of the bottom cups.

* * * * *